(12) United States Patent
Nicholas (10) Patent No.: US 11,610,505 B2
(45) Date of Patent: Mar. 21, 2023

(54) MUSICAL CHORD CONVERSION AID DEVICE

(71) Applicant: Dionisios Nicholas, Mililani, HI (US)

(72) Inventor: Dionisios Nicholas, Mililani, HI (US)

(*) Notice: Subject to any disclaimer, the term of this patent is extended or adjusted under 35 U.S.C. 154(b) by 0 days.

(21) Appl. No.: 17/572,866

(22) Filed: Jan. 11, 2022

(65) Prior Publication Data

US 2022/0293002 A1 Sep. 15, 2022

Related U.S. Application Data

(60) Provisional application No. 63/160,255, filed on Mar. 12, 2021.

(51) Int. Cl.
*G09B 15/00* (2006.01)
*G10G 1/02* (2006.01)

(52) U.S. Cl.
CPC .............. *G09B 15/005* (2013.01); *G10G 1/02* (2013.01)

(58) Field of Classification Search
CPC ................................ G09B 15/005; G10G 1/02
See application file for complete search history.

(56) References Cited

U.S. PATENT DOCUMENTS

| | | | | |
|---|---|---|---|---|
| 2,832,252 A * | 4/1958 | Gabriel | ................ | G09B 15/006 84/473 |
| 3,671,661 A * | 6/1972 | Yoshida | .................. | G06G 1/00 84/473 |
| 3,791,254 A * | 2/1974 | Muller | ................. | G09B 15/005 84/471 SR |
| 3,884,113 A * | 5/1975 | Leonard | .................... | G10G 1/02 984/252 |
| 3,894,465 A * | 7/1975 | Simmons | ............. | G09B 15/006 84/485 R |
| 3,937,118 A * | 2/1976 | Leonard | .................... | G10G 1/02 84/473 |
| 3,949,640 A * | 4/1976 | Cournoyer | ............... | G10G 1/02 84/473 |
| 4,960,029 A * | 10/1990 | Nelson | ................. | G09B 15/026 235/89 R |
| 5,386,757 A * | 2/1995 | Derrick | ................ | G09B 15/008 84/485 SR |
| 6,331,668 B1 * | 12/2001 | Michero | ................ | G09B 15/02 84/613 |

(Continued)

FOREIGN PATENT DOCUMENTS

GB 2262182 A * 6/1993 .......... G09B 15/005

*Primary Examiner* — Robert W Horn
(74) *Attorney, Agent, or Firm* — Brennan, Manna & Diamond, LLC (57) ABSTRACT

The present invention relates to a music chords conversion device. The device is used for providing instant representation showing conversion or correlation of major chords to minor chords and vice versa. The device can come in two variants (1) a physical device (2) a digital device. The physical device has a chords conversion component and a minor chords component wherein the minor chords component is configured to slide into the chords conversion component through a cut-out opening. The minor chords can be correlated to the major chords and displayed in a viewing region of the chords conversion component. The digital device includes a memory for storing the chords conversion and also includes a digital display for displaying the converted minor and major chords.

20 Claims, 7 Drawing Sheets

(56) References Cited

U.S. PATENT DOCUMENTS

| | | | |
|---|---|---|---|
| 7,332,665 B2* | 2/2008 | Haney .................. | G09B 15/006 84/470 R |
| 7,579,542 B2* | 8/2009 | Pearlman ............. | G09B 15/026 84/471 SR |
| 2022/0293002 A1* | 9/2022 | Nicholas .............. | G09B 15/026 |

* cited by examiner

MUSICAL CHORD CONVERSION AID DEVICE

CROSS-REFERENCE TO RELATED APPLICATION

The present application claims priority to, and the benefit of, U.S. Provisional Application No. 63/160,255, which was filed on Mar. 12, 2021 and is incorporated herein by reference in its entirety.

FIELD OF THE INVENTION

The present invention relates generally to the field of musical assistance devices. More specifically, the present invention relates to a music theory aid device featuring a sliding ruler that converts major chords to minor chords and vice-versa for various musical instruments. The music theory aid device comprises a first piece of ruler having a slot and a second piece configured to be inserted into the slot of the first piece, wherein the first piece comprises major chords written or printed on its left side and allows the second piece to slide on the right side through the slot, such that minor chords written or printed on the second piece corresponds to the major chords written on the first piece. It is to be appreciated that the major chord contains the 1st, 3rd and 5th degree of the major scale. The minor chord contains the 1st, flattened 3rd and 5th degree of the major scale of that note. This formula can be tediously applied to figure out the notes in any major or minor scale. Music is all about patterns. The correspondence between the major and minor chords helps in creating an instant reference for creating music through various musical instruments. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, different people have interest in playing and creating music using different musical instruments. For making and playing music, people generally need to have a thorough knowledge of music theory and are required to remember notes and chords for their musical instrument of interest. Generally, every musical instrument has basic chords, namely major chords and minor chords, that are associated with various keys of musical instruments. Identifying different chords, notes and converting chords while playing any musical instrument can be helpful for those trying to learn how to make their own music.

Without remembering the chords, people may have a difficult time in making and playing music. Since, there are a plurality of chords and notes to remember, people may find it extremely difficult to learn and remember the notes and chords. Especially for beginner musicians or those with physical limitations or disabilities, it is extremely difficult to remember the notes for any musical instrument.

In the case where a person is unable to remember the notes or chords, then the person fails to convert major chords to minor chords, and vice-versa, and therefore fails to play and make music. This demotivates beginners and makes them reluctant to play/make music using their favorite musical instruments.

Therefore, there exists a long felt need in the art for a musical theory aid device that enables the users to remember chords and notes of the musical instrument of their choice. There is also a long felt need in the art for a musical theory aid device that can be easily used by beginners, or people with some physical limitations or disabilities. Additionally, there is a long felt need in the art for a musical theory aid device that allows the users to easily learn and remember chords and notes, and is helpful in playing and creating music. Moreover, there is a long felt need in the art for a musical theory aid device that enables the users to easily and quickly convert the major chords to minor chords and vice-versa, for playing and making music using their favorite musical instruments. Further, there is a long felt need in the art for a musical theory aid device that makes it easy to identify different chords and notes for learning music. Furthermore, there is a long felt need in the art for a musical theory aid device that eliminates the need to remember chords. Finally, there is a long felt need in the art for a musical theory aid device that offers a simple way to help people identify chords with ease.

The subject matter disclosed and claimed herein, in one embodiment thereof, comprises a musical chord conversion device that is configured to be used for identifying and converting chords for different musical instruments. The musical chord conversion device includes a chord conversion component and a minor chords sheet. The chord conversion component is a generally cuboidal-shaped component comprising: major chords printed on a left side of an upper surface and also having a cut out on a right side of an upper surface; a first slit on a bottom lateral face; a second slit on a top lateral face; the cut-out on the upper surface, the first slit, and the second slit are vertically aligned; the minor chords sheet is configured to be inserted and slide through the first slit towards the second slit; and, the minor chords printed on the minor chords sheet are aligned laterally to the corresponding major chords for creating an instant reference for chords conversion and music creation. The major chords and minor chords printed or written on the components of the musical chord conversion device are not fixed, and can be changed as per the needs and desires of the users.

In this manner, the novel musical chord conversion device of the present invention accomplishes all of the forgoing objectives, and provides a relatively easy, convenient and efficient solution to learn and identify chords to play and create music using musical instruments. The musical theory aid device of the present invention is also user-friendly, as it is quite helpful for beginner musicians and those with physical limitations or disabilities, and helps them easily learn and convert the chords. Additionally, the musical theory aid device is portable and can be easily carried to places to quickly identify and convert the musical chords.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a musical chord conversion device. The musical chord conversion device includes a chord conversion component and a minor chords sheet. The chord conversion component is a generally cuboidal component having major chords printed on a top surface; a cut out on the top surface; a first slit on a bottom lateral face; a second slit on top lateral face; the cut-out on the top surface, the first slit, and the second slit are vertically aligned; the minor chords sheet is configured to insert and slide through the first slit towards the second slit; and, the minor chords printed on the minor chords sheet are aligned laterally to the corresponding major chords for creating an instant reference for chords conversion and music creation. The major chords are printed towards the left edge of the top surface and the cut-out is positioned towards the right edge of the top surface.

In a further embodiment of the present invention, a music chords conversion digital device. The digital device is configured and designed to convert and digitally display major chords and minor chords. The digital device further comprises: a digital display; an internal memory for storing a chords conversion table correlating major chords and minor chords; a processor to receive an instruction and fetch chords conversion data to display on the digital display; and, an internal battery for providing power to the digital display for displaying the major chords and the converted minor chords. The display device has a control button to turn on and off the display device.

In a further embodiment of the present invention, a method for conversion of major chords and minor chords is described. The method comprises: providing a chords conversion component having desired major chords and a longitudinal cut-out region; selecting a corresponding minor chords component; sliding the minor chords component through a slit of the chords conversion component; controlling the sliding of the minor chords component into the chords conversion component; and, viewing the correlated major chords and the minor chords through the cut-out region. Using the described method, an instant reference for music creation is shown by the chords conversion component enabling a user to convert chords as per the desired preferences without requiring to remember the chords.

In yet a further embodiment of the present invention, a user does not need to remember the major/minor chords conversion. The device and method serve as a functional reminder as to where each chord is played to create music. The device allows users to easily identify chords for making and playing music without remembering each one. The present invention can be used for transposing the chords and a customized conversion of chords based on the preferences of a user. The device and method of the present invention is easy to use and can be used in music schools as a teaching guide, and also used as a reference by both novice and expert musicians.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a musical theory aid device that enables the users to remember chords and notes of the musical instrument of their choice. There is also a long felt need in the art for a musical theory aid device that can be easily used by beginners, or people with some physical limitations or disabilities. Additionally, there is a long felt need in the art for a musical theory aid device that allows the users to easily learn and remember chords and notes, and is helpful in playing and creating music. Moreover, there is a long felt need in the art for a musical theory aid device that enables the users to easily and quickly convert the major chords to minor chords and vice-versa, for playing and making music using their favorite musical instruments. Further, there is a long felt need in the art for a musical theory aid device that makes it easy to identify different chords and notes for learning music. Furthermore, there is a long felt need in the art for a musical theory aid device that eliminates the need to remember chords. Finally, there is a long felt need in the art for a musical theory aid device that offers a simple way to help people identify chords with ease.

The present invention, in one potential embodiment, includes a novel musical chord conversion device that eliminates the need to remember the chords and the theory related to chords conversion. The device and method disclosed in the present invention can serve as a functional reminder as to where each chord is played to create music. The device allows users to easily identify chords for making and playing music without remembering or memorizing each one. The present invention can be used for transposing the chords and a customized conversion of chords based on the preferences of a user. The device and method of the present invention is easy to use and can be used in music schools for reference and teaching; and, also can be used by both novice and expert musicians for making and playing music.

In one illustrative explanation, correlating a major scale into its relative minor scale includes moving to a 6th tone. For example, starting with the C major scale (C D E F G A B C), and if each tone is turned into a number (i.e. C is 1, D is 2, E is 3, F is 4, G is 5, A is 6, B is 7), then "A" is the 6th tone. Thus, C major and A minor can be referred to as relative keys. C is the relative major of A minor, and A minor is the relative minor of C major. Chords work the same in similar fashion. For example, a C major chord can include notes C, E, G. To correlate this chord into its relative minor chord (i.e. "A minor"), one can simply add the "6th" tone to the bottom of the chord. The result is an A minor 7 chord. As another example, if in the key of F, an F major chord can be used to identify a 6th tone, which is D, and the result is a D minor 7 chord. The present disclosure provides for a quick and easy device for correlating major and minor chords similar to the examples described above.

Figure 1:
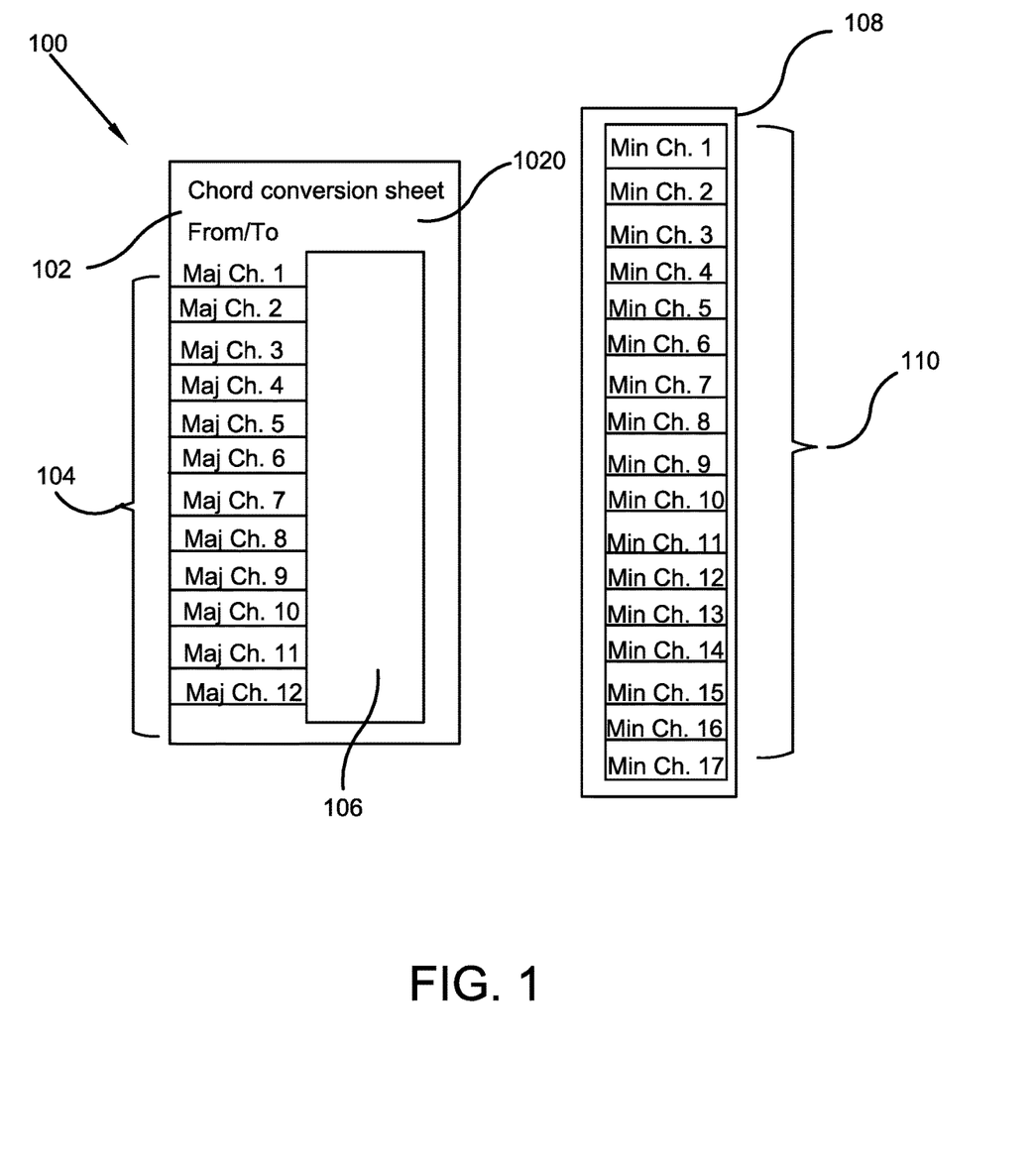
FIG. 1 illustrates a perspective view of one potential embodiment of a musical chord conversion device of the present invention in accordance with the disclosed architecture.

Referring initially to the drawings, FIG. 1 illustrates a perspective view of one potential embodiment of a musical chord conversion device of the present invention in accordance with the disclosed architecture. The musical chord conversion device 100 of the present invention provides users with a music theory aid device that features a pair of ruler-like devices (i.e. slide rules or line gauges) for converting major chords to minor chords and vice-versa. A user can easily view the minor chords corresponding to major chords without having to remember or memorize the chords.

The musical chord aid device 100 includes a pair of separate sheets, rulers, or line gauges, including a major chords component 102 and a minor chords component 108. The major chords component 102 can be referred to as a chords conversion sheet/component. The components 102, 108 can be made of a paper, cardboard or lightweight plastic. The major chords component 102 can be generally cuboidal in shape including a plurality of desired major chords 104 written towards the left side of an upper surface 1020. The upper surface 1020 includes a cut-out 106 through which a user can see corresponding minor chords 110 for easy musical chord conversion without having to remember or memorize the musical chords. The cut-out 106 can be covered with a transparent sheet as well. A separate minor chords component 108 includes a list of desired minor chords 110 that correspond to the major chords 104 and the sheet 108 can be configured to slide as a tab through a slit or opening 204 of a housing 202 of the cuboidal major chord sheet 102, enabling the user to view and correlate the major chords 104 and the minor chords 110 in the cut-out area 106. The minor component 108 can be planar and configured for easy sliding within the housing 202 alongside the major chords component 102.

In the present embodiment, the length of the major chords component or chord conversion component 102 can generally be from about 3" to about 6", for example. The width of the major chords component 102 can generally be from about 1" to about 4", for example. The musical chord aid device 100 can be used by novices and professionals. It is equally suitable as a teaching aid device for beginners who have difficulty in learning and understanding musical chords conversion.

Figures 2A, 2B:
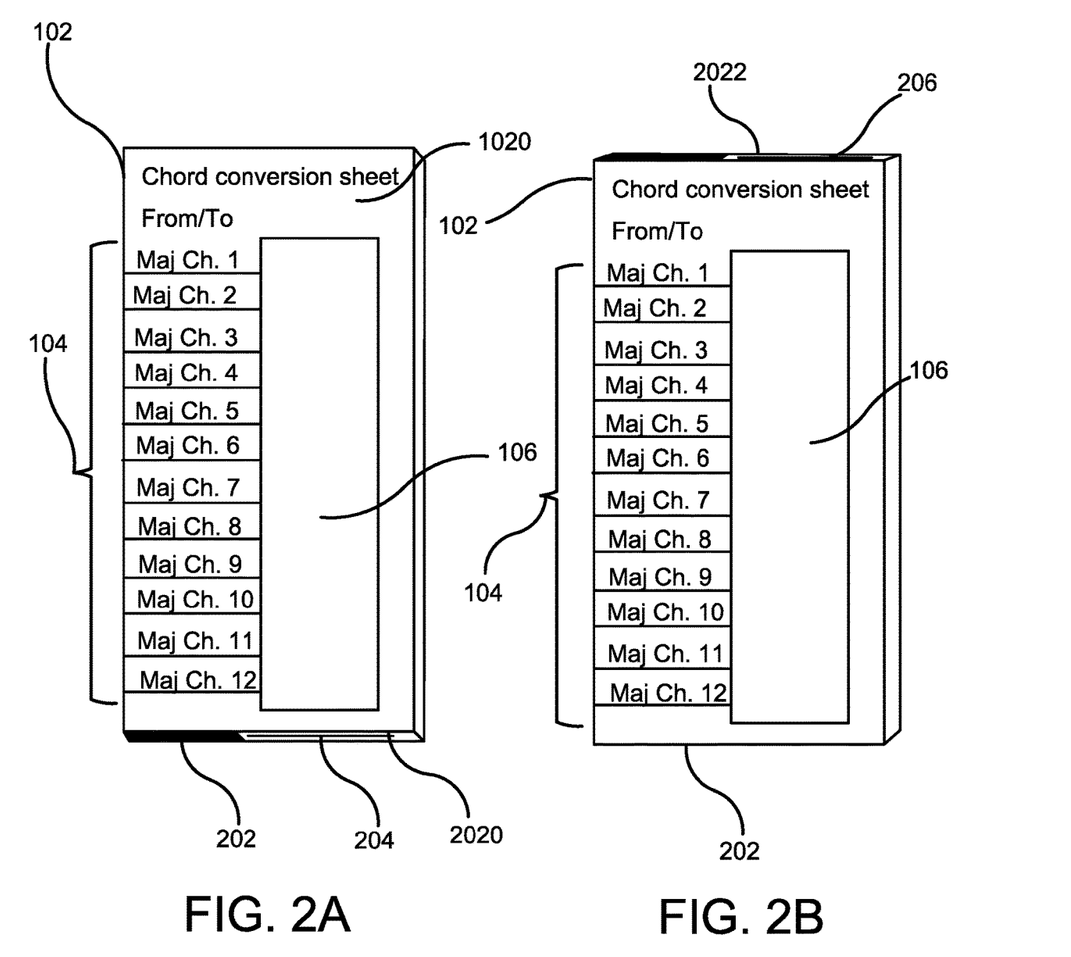
FIG. 2A illustrates a perspective view showing a bottom slit of the chords conversion component of the present invention in accordance with the disclosed architecture.
FIG. 2B illustrates a perspective view showing a top slit of the chords conversion component of the present invention in accordance with the disclosed architecture.

FIG. 2A illustrates a perspective view showing a bottom slit of the chords conversion component of the present invention in accordance with the disclosed architecture. The major chords component 102, includes the hollow housing 202, and the major chords 104 are written on the upper or outer surface 1020. The slit or opening 204 is positioned directly below the cut-out 106 of the upper surface 1020 along a bottom lateral face 2020. The slit 204 includes a width generally equal to the width of cut-out 106 and can be used for moving in/out the minor chords component 108 of the chords aid device into housing 202 of the major chords sheet 102. When inserted, the minor chords 110 correspond (i.e. correlate) to the major chords 104 and can be viewed through the cut-out region 106.

FIG. 2B illustrates a perspective view showing a top slit of the chords conversion component of the present invention in accordance with the disclosed architecture. A second slit 206 is positioned directly above the cut-out 106 of the upper surface 1020 on a top lateral face 2022. The slit 206 includes a width generally equal to the cut-out 106 and can be used for sliding in/out the minor chords component 108 of the chords aid device relative to the housing 202 of the major chords component 102.

Figure 3:
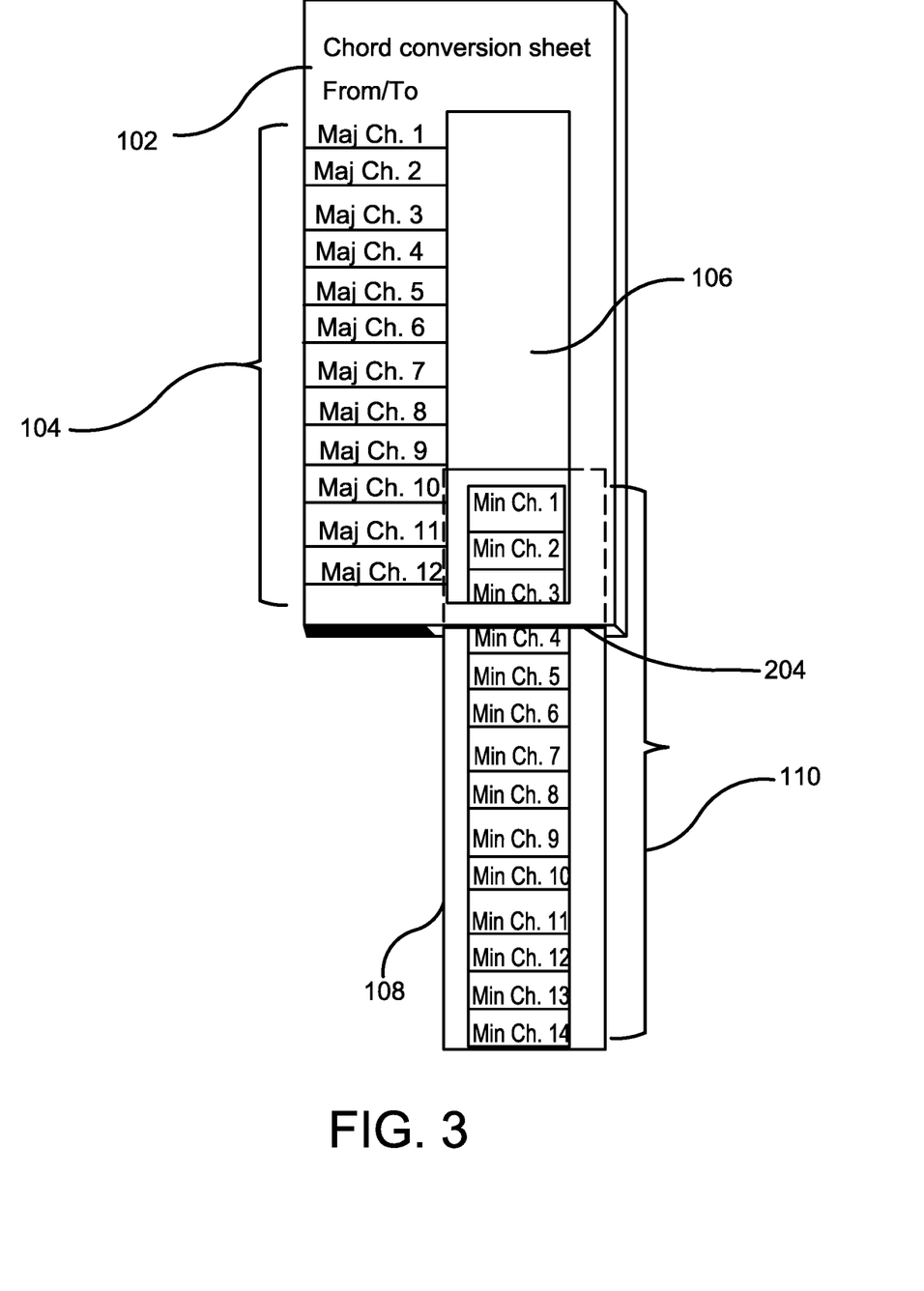
FIG. 3 illustrates a perspective view showing how the minor chords component is slid through the major chords component in accordance with the disclosed architecture.

FIG. 3 illustrates a perspective view showing how the minor chords component 108 can be slid through the major chords component 102, in accordance with the disclosed architecture. For enabling easy identification and mapping of the major chords 104 and minor chords 110 of musical instruments, the minor chords component 108 can be inserted through the slit 204 of the major chords component 102. When the minor chords component 108 is inserted and slid through the slit 204, the minor chords 110 are visible to a user from the opening defined by the cut-out region 106. The major chords 104 and the minor chords 110 are aligned such that each major chord corresponds to each minor chord which enables a user to convert and correlate the major chords 104 with minor chords 110, and vice-versa. An instant reference of the minor chords 110 with corresponding major chords 104 can be developed for creating music when the minor chords sheet 108 is slid into the chord conversion component 102.

As stated earlier, the minor chords 110 can be easily viewed through the cut-out region 106 for a proper viewing. The cut-out region 106 can include any width that provides adequate viewing, and in one potential embodiment can be generally 1.5", which enables viewing of the minor chords 110. The minor chords component 108 can include a width of 1.25" for easy sliding within the major chords sheet 102.

Figure 4:
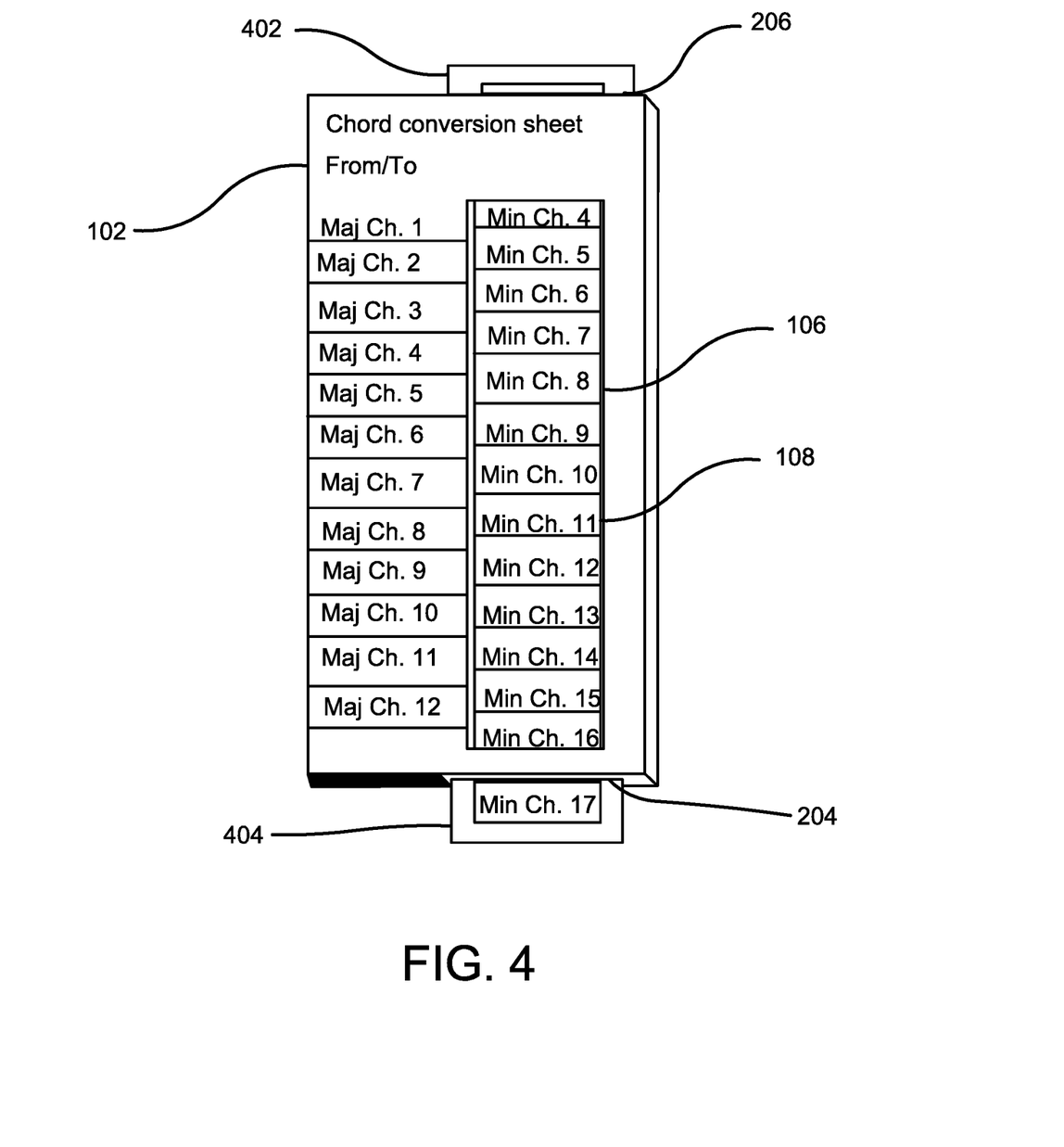
FIG. 4 illustrates a perspective view showing the minor chords component inserted in the major chords component of the present invention in accordance with the disclosed architecture.

FIG. 4 illustrates a perspective view showing the minor chords component inserted in the major chords component of the present invention in accordance with the disclosed architecture. The cut-out region 106 of the major chords component 102 shows the aligned minor chords 110 when the minor chords sheet 108 is slid through the chords conversion component 102. A top portion 402 of the minor component 108 can be slid through the top slit 206, and a bottom portion 404 of the minor component 108 can be accessed through the bottom slit 204, thereby enabling easy access of the minor chords component 108 of the music chords conversion device.

The components can be slid through as per the preferences and requirements of a user enabling perfect synchronization, conversion and/or correlation of the major chords to the minor chords and vice versa. It should be noted that the chords conversion device 100 can be used for transposing the music chords as well. The components can be customized to help a user in transposing the chords.

Figure 5:
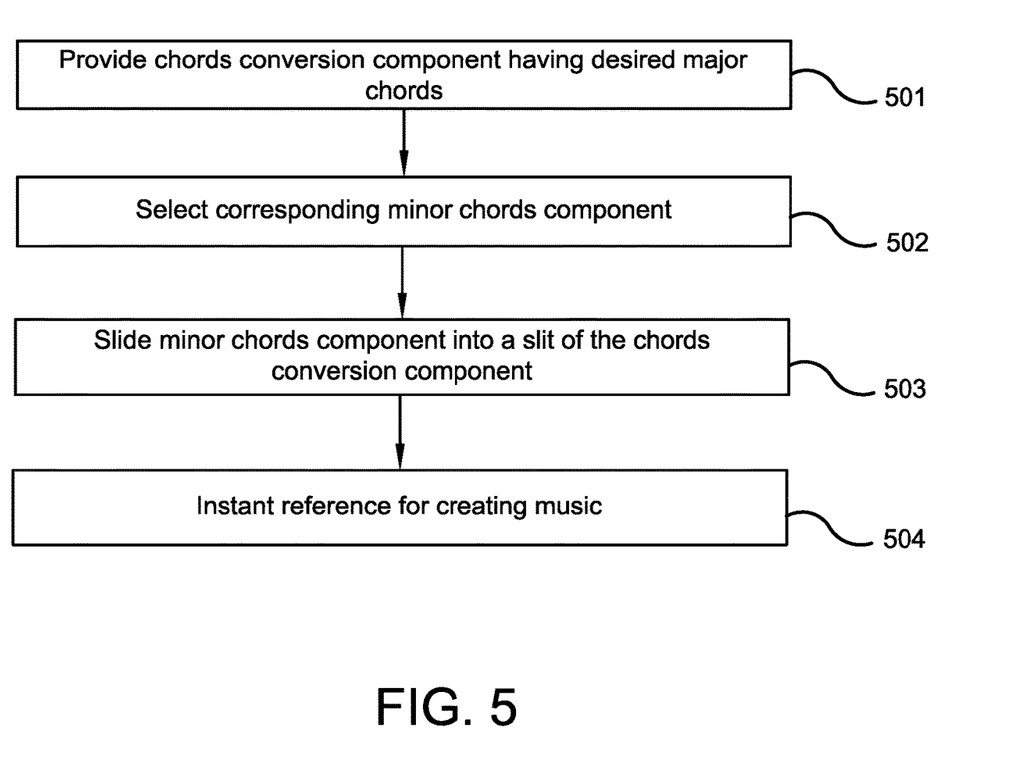
FIG. 5 illustrates a flow diagram showing the steps of using the chords conversion device for conversion of major chords to minor chords and vice versa in accordance with the disclosed architecture.

FIG. 5 illustrates a flow diagram showing the steps of using the chords conversion device for conversion of major chords to minor chords and vice-versa, in accordance with the disclosed architecture. Initially, a chords conversion component having desired major chords written on the left side is provided (Step 501). The chords conversion component can have a digital display or a printed display. Based on the major chords, a corresponding minor chords component can be selected (Step 502). The minor chords components selected can each include a list of minor chords printed on a sheet like surface or can include a digital display as well. The selectable minor chords components and can be slid into the slit of the chords conversion component (Step 503). The minor chords components can be easily slid into the housing of the chords conversion components enabling a user to view and control the sliding of each minor chords component. When the minor chords and the major chords are correlated, an instant reference for music creation is shown by the chords conversion component enabling a user to convert chords as per the preferences without requiring memorization of the chords (Step 504).

Figure 6:
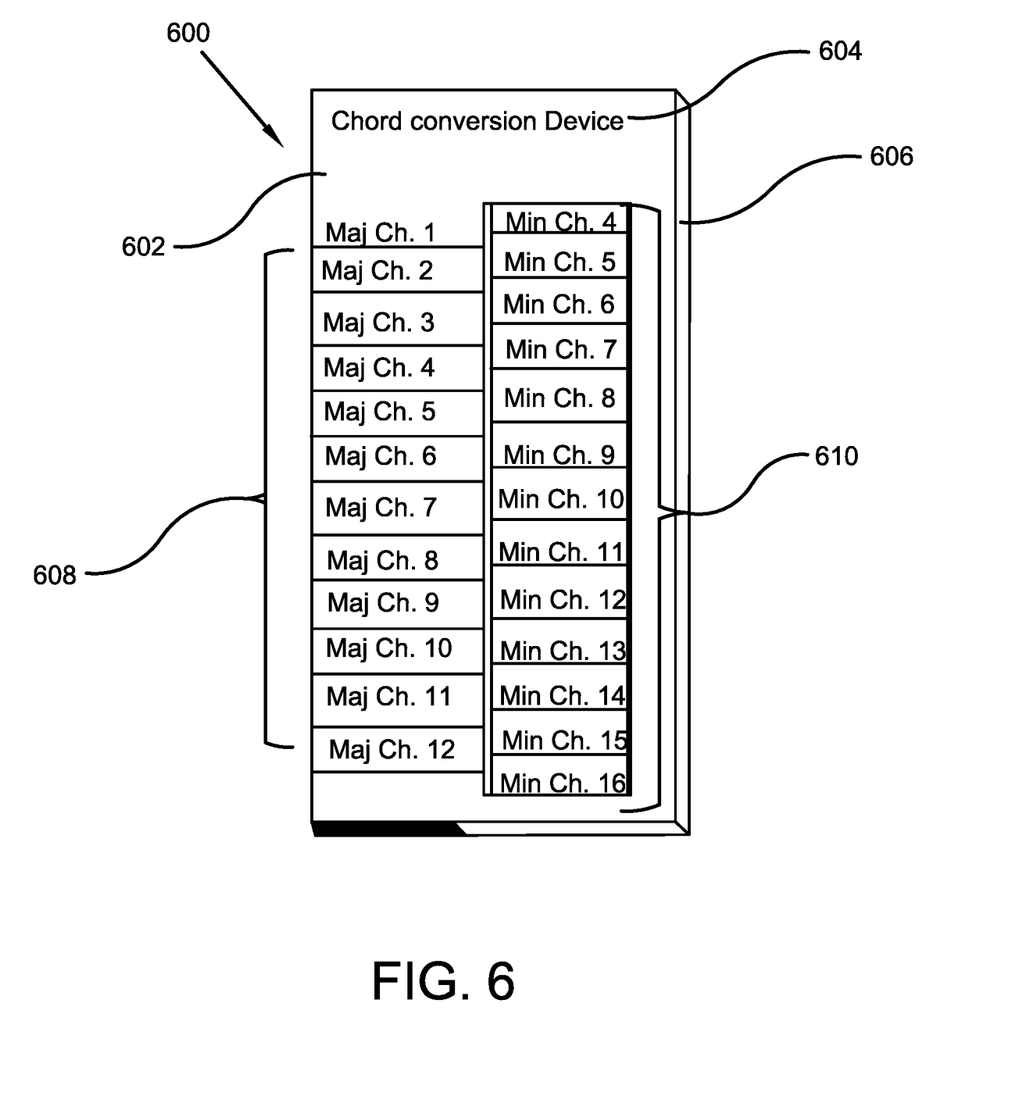
FIG. 6 illustrates a perspective view showing the chords conversion digital device of the present embodiment in accordance with the disclosed architecture.

FIG. 6 illustrates a perspective view showing the chords conversion digital device of one potential embodiment in accordance with the disclosed architecture. In the present embodiment, a chords conversion device 600 can be a digital device having a digital display 602. The digital display 602 can be activated using a control button 604 which can be a touch button. When the digital display 602 is activated using the control button 604, the major chords 608 and the corresponding minor chords 610 can be displayed in a correlated manner enabling a user to view the converted minor chord from the major chord and vice-versa. Additionally, a speaker 606 can be integrated to the device 600 enabling a user to listen to the sound of a converted chord when any chord is touched on the digital display by the user.

Figure 7:
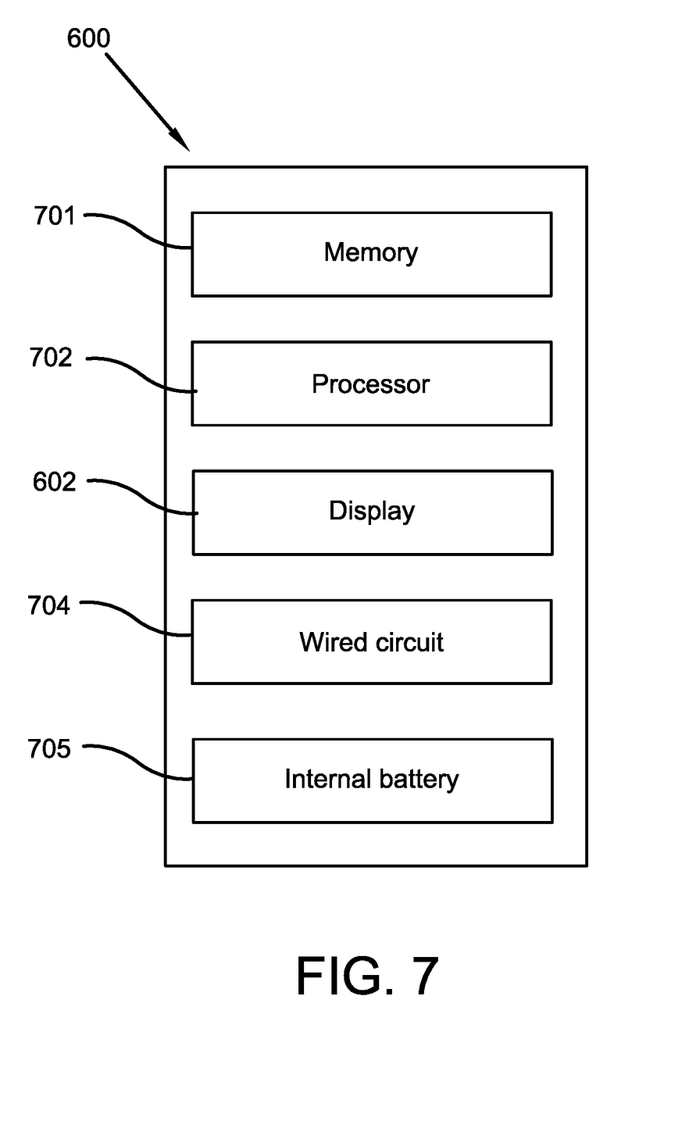
FIG. 7 illustrates a block diagram showing components of the chords conversion digital device in accordance with the disclosed architecture.

FIG. 7 illustrates a block diagram showing components of the chords conversion digital device in accordance with the disclosed architecture. The digital device 600 includes an internal memory 701 that stores chords conversion data for displaying on a digital display unit 602. A processor 702 receives the instruction of a user and displays the converted chords on the display unit 602. The processor 702 can also identify a specific major or minor chord based on a selection of a user. An internal battery 705 provides power to other components of the digital device 600 and all the components are connected through an internal wired circuit 704.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "musical chord conversion device", "music chords conversion digital device", "musical chord aid device", "musical theory aid device", "musical theory aid" and "chord conversion device", are interchangeable and refer to the musical chord conversion device 100 of the present invention.

Notwithstanding the forgoing, the musical chord conversion device 100 of the present invention can be of any suitable size and configuration as is known in the art without affecting the overall concept of the invention, provided that it accomplishes the above-stated objectives. One of ordinary skill in the art will appreciate that the size, configuration, and material of the musical chord conversion device 100 as shown in the FIGS. are for illustrative purposes only, and that many other sizes and shapes of the musical chord conversion device 100 are well within the scope of the present disclosure. Although the dimensions of the musical chord conversion device 100 are important design parameters for user convenience, the musical chord conversion device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A musical chord conversion device comprising:
   a first slide rule and a second slide rule for correlating major chords to minor chords;
   said first slide rule fixed in a housing;
   said second slide rule movable within an opening in said housing;
   said first slide rule includes a listing of major chords in a vertical orientation;
   said second slide rule includes a listing of minor chords in a vertical orientation;
   each listing of a minor chord slidable adjacent to each listing of a major chord to correlate a minor chord to a designated major chord; and
   said correlated minor chord viewable in said opening of said housing.

2. The musical chord conversion device of claim 1, wherein said first slide rule and said second slide rule are line gauges.

3. The musical chord conversion device of claim 1, wherein said housing includes a bottom cut-out on a bottom side and a top cut-out on a top side for sliding in and out said second slide rule within said housing.

4. The musical chord conversion device of claim 1 further comprising a third slide rule movable within said opening in said housing;
- said at least third slide rule includes another listing of minor chords in a vertical orientation;
- each listing of another minor chord slidable adjacent to each listing of another designated major chord to correlate said another minor chord to said another designated major chord; and
- said correlated another minor chord viewable in said opening of said housing.

5. The musical chord conversion device of claim 4, wherein said first slide rule and said second slide rule are plastic.

6. The musical chord conversion device of claim 5, wherein said opening is covered by a transparent sheet.

7. The musical chord conversion device of claim 1, wherein a top of said second slide rule slides in and out of said top cut-out and a bottom of said second slide rule slides in and out of said bottom cut-out.

8. A musical chord conversion device comprising:
- a first slide rule and a second slide rule for correlating major chords to minor chords;
- said first slide rule fixed in a housing;
- said second slide rule movable within an opening in said housing;
- said first slide rule includes a listing of major chords in a vertical orientation;
- said second slide rule includes a listing of minor chords in a vertical orientation;
- each listing of a minor chord slidable adjacent to each listing of a major chord to correlate a minor chord to a designated major chord;
- said correlated minor chord viewable in said opening of said housing;
- at least a third slide rule movable within said opening in said housing;
- said at least third slide rule includes another listing of minor chords in a vertical orientation;
- each listing of another minor chord slidable adjacent to each listing of another designated major chord to correlate said another minor chord to said another designated major chord; and
- said correlated another minor chord viewable in said opening of said housing.

9. The musical chord conversion device of claim 8, wherein said first slide rule, said second slide rule, and said at least third slide rule are line gauges.

10. The musical chord conversion device of claim 9, wherein said housing includes a bottom cut-out on a bottom side and a top cut-out on a top side for sliding in and out said second slide rule or said at least third slide rule within said housing.

11. The musical chord conversion device of claim 8, wherein said first slide rule, said second slide rule, and said at least third slide rule are electronic digital displays.

12. The musical chord conversion device of claim 11, wherein said opening is covered by a transparent sheet.

13. The musical chord conversion device of claim 12, wherein a top of said second slide rule slides in and out of said top cut-out and a bottom of said second slide rule slides in and out of said bottom cut-out.

14. A method for converting a musical major chord to a musical minor chord, the method comprising the steps of:
- providing a housing with a first slide rule affixed thereto;
- providing at least a second slide rule adjacent to said first slide rule;
- said second slide rule movable within an opening in said housing;
- said first slide rule includes a listing of musical major chords;
- said second slide rule includes a listing of musical minor chords;
- specifying a selected musical major chord;
- selecting said at least second slide rule corresponding to said selected musical major chord;
- sliding said second slide rule within said housing; and
- correlating a listing of musical minor chords to said selected musical major chord.

15. The method of claim 14, wherein said first slide rule includes said listing of major chords in a vertical orientation, and further wherein said second slide rule includes said listing of minor chords in a vertical orientation.

16. The method of claim 15, wherein said first slide rule and said second slide rule are line gauges.

17. The method of claim 16, wherein said housing includes a bottom cut-out on a bottom side and a top cut-out on a top side for sliding in and out said second slide rule within said housing.

18. The method of claim 17, wherein said first slide rule and said second slide rule are plastic.

19. The method of claim 17, wherein said opening is covered by a transparent sheet.

20. The method of claim 17, wherein a top of said second slide rule slides in and out of said top cut-out and a bottom of said second slide rule slides in and out of said bottom cut-out.

* * * * *